United States Patent [19]

Loomans et al.

[11] Patent Number: 4,826,323

[45] Date of Patent: May 2, 1989

[54] SELF-WIPING CONTINUOUS MIXER WITH ENLARGED BORE SECTION

[75] Inventors: Bernard A. Loomans; James E. Kowalczyk, both of Saginaw, Mich.

[73] Assignee: APV Chemical Machinery Inc., Saginaw, Mich.

[21] Appl. No.: 197,517

[22] Filed: May 23, 1988

[51] Int. Cl.⁴ .............................................. B29B 1/10
[52] U.S. Cl. ...................................... 366/85; 366/301
[58] Field of Search .......................... 366/85, 84, 86, 83, 366/91, 297, 298, 299, 300, 301, 318, 320, 321, 322, 323; 425/200, 205, 208, 209

[56] References Cited

U.S. PATENT DOCUMENTS

| | | | |
|---|---|---|---|
| 3,195,868 | 7/1965 | Loomans | 366/85 |
| 3,305,894 | 2/1967 | Boden | 366/85 |
| 3,387,826 | 6/1968 | Loomans | 366/85 |
| 3,614,070 | 10/1971 | Loomans | 366/287 |
| 3,698,693 | 10/1972 | Poncet | 366/301 |
| 3,900,187 | 8/1975 | Loomans | 366/85 |
| 4,344,711 | 8/1982 | Kendall | 366/301 |
| 4,370,061 | 1/1983 | Livingston | 366/85 |
| 4,423,960 | 1/1984 | Anders | 366/85 |

Primary Examiner—Robert W. Jenkins
Attorney, Agent, or Firm—Learman & McCulloch

[57] ABSTRACT

A mixing machine barrel has parallel interconnected bores of a first diameter with axially parallel shafts driven at the same speed and in the same direction of rotation extending therein. Mixer members on the shafts are shaped to co-wipe and also wipe the interior of the barrel. A barrel section communicates with the barrel and has interconnected bores of greater diameter which include interconnected transition bores of progressively changing diameter. Blades extend at an angle from the shafts through the transition bores and are configured to wipe one another over their length, and the interconnected bores of the barrel section over their length.

19 Claims, 3 Drawing Sheets

SELF-WIPING CONTINUOUS MIXER WITH ENLARGED BORE SECTION

BACKGROUND OF THE INVENTION

This invention relates to mixing, kneading, and processing machinery of the type in which at least two parallel shafts with mating worms or the like thereon are in continuous wiping engagement with the walls of the barrel or vessel through which the shafts extend, and also are in continuous inter-wiping relationship. Machinery of this design, wherein the materials being mixed or processed are subjected to an intense shearing and kneading action as they proceed continuously through the machine, and all product contacting sufraces of the mixer are continuously wiped clean during the operation of the mixer, are well known and used in a variety of processes, particularly where doughy or viscous materials are being processed. Machines of this character have been provided with worms in the form of progressively angularly displaced paddles, either straight or formed on a helix, provided in axially abutting relation on the mixing shafts such as exemplified, for instance, in U.S. Pats. Nos. 3,195,868; 3,387,826; and 3,423,074. Such machines have also been provided with worms in the form of elongate screws as disclosed in U.S. Pats. Nos. 3,900,187; 3,305,894; and 3,698,693, for example. The mixing machines to which I've referred are what may be termed "fixed axis of rotation" machines, but orbiting twin screws have also been proposed, as disclosed in U.S. Pat. No. 3,614,070. U.S. Pat. No. 4,344,711 in a vertical batch mixer discloses a fixed axis of rotation machine wherein helical blades both mutually co-wipe and wipe the wall of the vessel of figure eight cross-section, but leave a central core of material which is not penetrated by the blades. The purpose of the various prior art designs has been to provide some versatility in machines of this character to suit them to homogenously mix and/or knead materials which may be in plastic, liquid, granular, or powder form. The prior art machines have, however, not been found to provide the versatility desired for processing many materials such as processing operations in which light or fibrous materials are to be introduced to a viscous mass and homogenously dispersed therein throughout the whole mass.

SUMMARY OF THE INVENTION

In one aspect thereof, the invention is concerned with providing a machine in which the shafts rotate about a fixed axis of rotation and still are capable of providing the same self-wiping and barrel-wiping result in a mixing bore or barrel section of increased diameter in whcih less intensive mixing is effected in one section of the machine than another.

One of the prime objects of the invention is to provide a machine of the character described wherein material being intensively mixed is transferred to an integrated larger barrel section which provides a relatively "starved" zone wherein the material is subjected to less power input, has an increased retention time, wherein greater heat transfer can be accomplished, and wherein deaeration and devolatilization of the mass is enhanced, all while the material is still being moved continuously through the mixer.

Another object of the inevntion is to provide a machine of this type in which all of the self-wiping and barrel-wiping which characterizes conventional equipment is maintained in transition sections leading to and from the enlarged zone without interruption of the process flow stream.

Still another object of the invention is to provide a machine of the type described which enhances the feeding of difficult-to-feed material such as light and fibrous material, while providing the type of mixing dictated by process requirements.

Still another object of the invention is to provide a machine in which an enlarged bore can be provided at the desired location longitudinally, to provide a maximum heat transfer zone in the continuous mixer at the required location for best processing of the material.

Still another object of the invention is to provide a machine in which increased dwell or retention time can be provided in the mixer at the time in the process best suited to achieving the results desired.

Still another object of the invention is to provide a machine of completely self-wiping design which can transition from a zone of intensive mixing to an enlarged zone of less intensive mixing, and then return to a reduced size discharge zone.

A further object of the invention is to provide a machine which economically incorporates an increased cross-sectional area chamber which enhances the machine's capabilities and eliminates the need for multiple processing machines.

Still a further object of the invention is to provide a machine which can utilize, in addition to single-lead worms, other worms having an odd number of leads.

Other objects and advantages of the invention will be pointed out specifically or will become apparent from the following description when it is considered in conjunction with the appended claims and the accompanying drawings.

Figure 1:
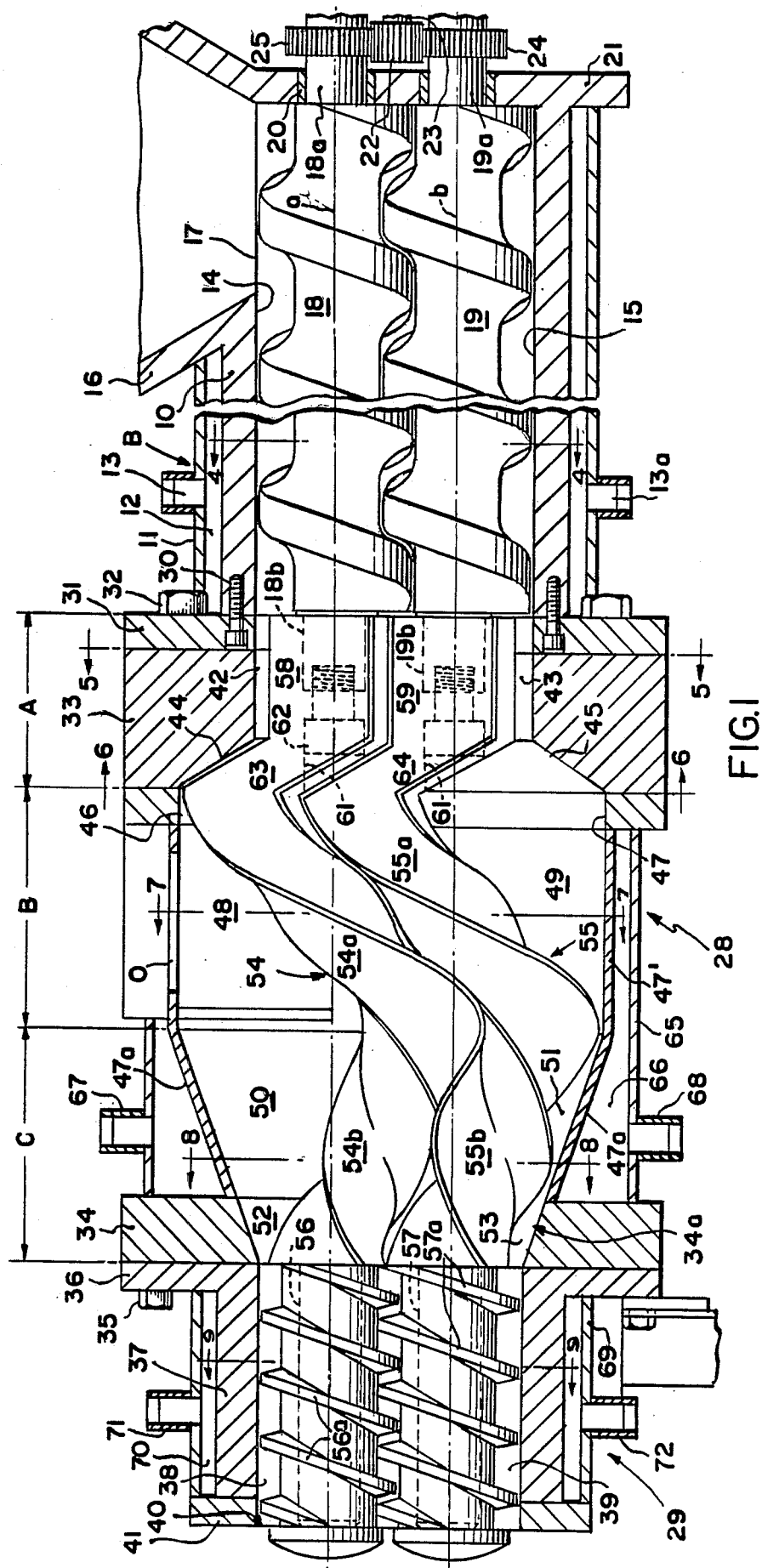
FIG. 1 is a somewhat schematic, sectional, side elevational view of a machine formed in accordance with the invention, the gap between the mating mixing members, and the mixing members and barrel wall, being shown exaggerated in the interest of clarity of illustration.
Figure 2:
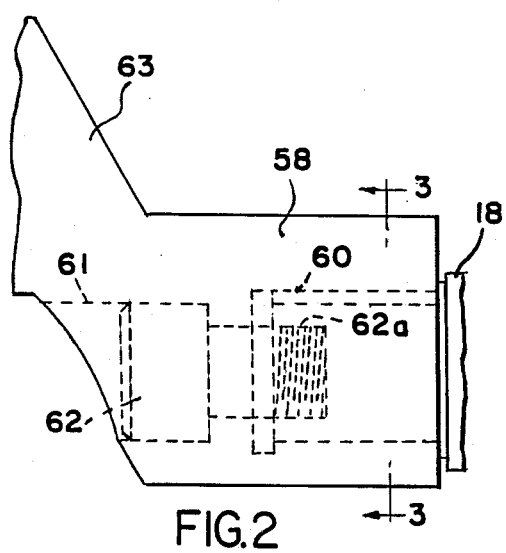
FIG. 2 is an enlarged, fragmentary, elevational view of one of the shaft sections which leads into the enlarged mixing chamber.
Figure 3:
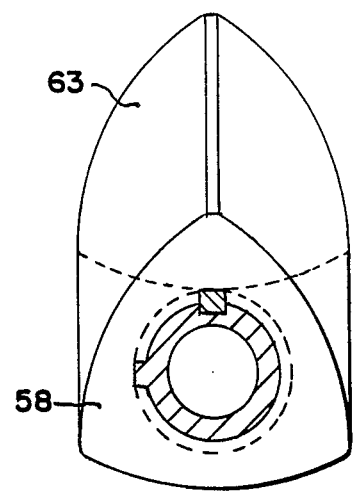
FIG. 3 is a transverse, sectional, elevational view taken on the line 3—3 of FIG. 2.

Referring now more particularly to the accompanying drawings, and in the first instance to FIG. 1, a mixer housing or barrel, generally designated B, is shown as having an inner casing or housing of elongate character, generally designated 10, which is figure eight-shaped in cross-section, and surrounded by a jacket 11, defining a surrounding chamber 12 which may be filled with a recirculating heat transfer fluid. Heat transfer fluid, of either heating or coolant nature, depending on the process involved, may be supplied through an opening 13, and egressed through an opening 13a, in the usual manner.

Figure 4:
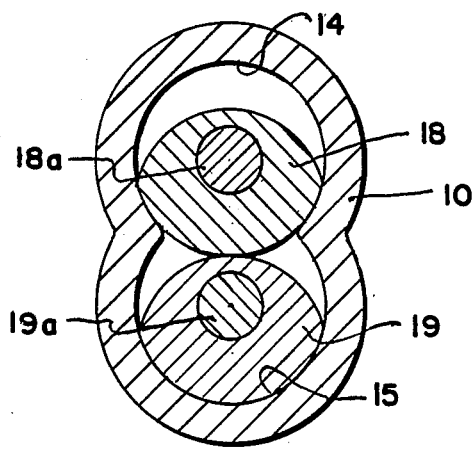
FIG. 4 is a transverse sectional view taken on the line 4—4 of FIG. 1, the downstream parts of the machine being omitted in the interest of clarity.
Figure 5:
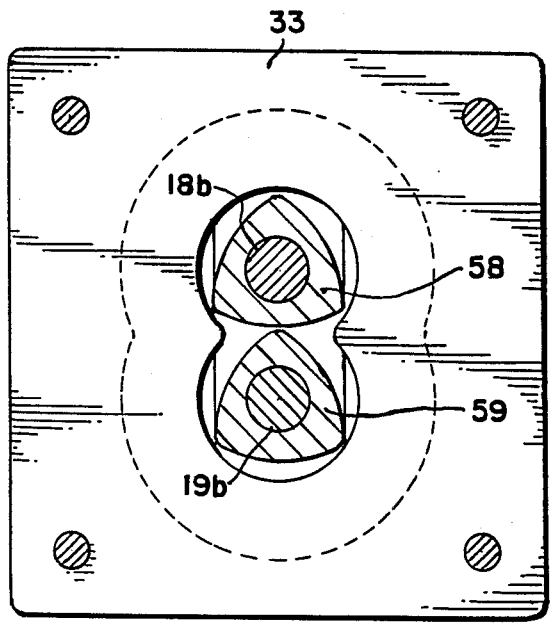
FIG. 5 is a transverse sectional view taken on the line 5—5 of FIG. 1.
Figure 6:
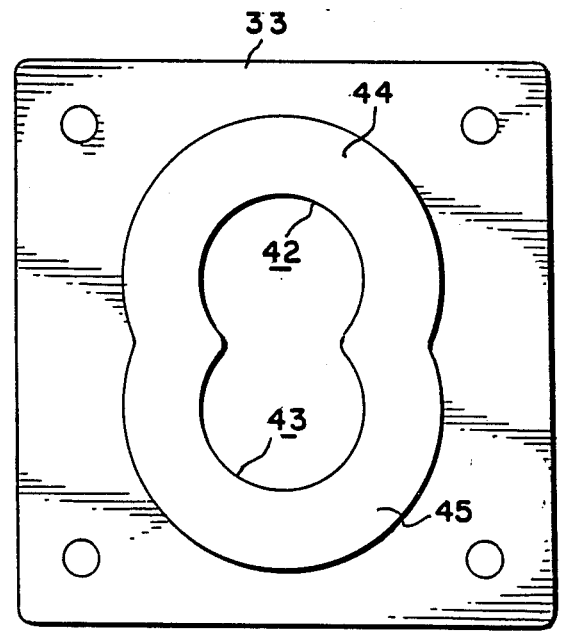
FIG. 6 is a transverse sectional view taken along the line 6—6 of FIG. 1, with the worm blades being omitted in the interest of clarity.
Figure 7:
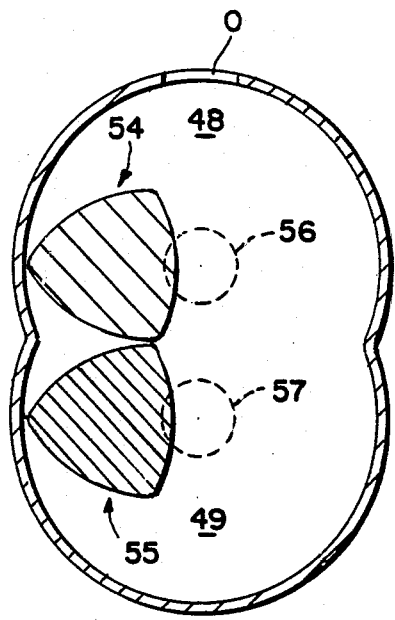
FIG. 7 is a transverse sectional view like FIG. 4 taken on the line 7—7 of FIG. 1.
Figure 8:
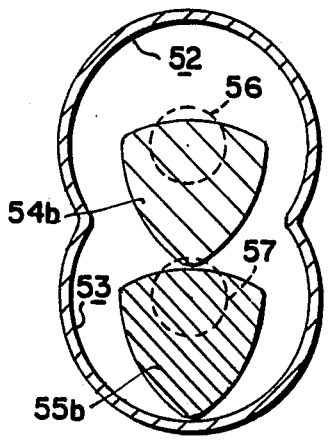
FIG. 8 is a transverse sectional view like FIG. 4 taken on the line 8—8 of FIG. 1.
Figure 9:
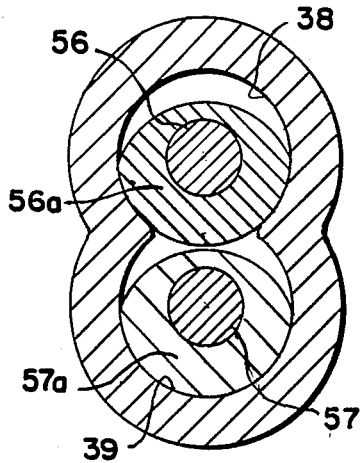
FIG. 9 is a transverse, sectional view like Figure 4 taken on the line 9—9 of FIG. 1.

As FIG. 4 indicates, the casing 10 defines an overall mixing chamber comprising an upper cylindrical bore 14 intersecting with a lower cylindrical bore 15, which together provide intercommunicating mixing chambers in the usual manner. A hopper or chute 16 leads to a material charging opening 17 communicating with the upper chamber 14 at one end of the machine. Provided to extend axially through the bore chambers 14 and 15 on axes a and b are single lead worms 18 and 19, which are concentrically keyed on or integrated with shafts 18a and 19a, which may be journaled for rotation in suitable bearings 20, provided in the one end wall 21 of the machine. A drive gear 22, mounted on a shaft 23 connected to a suitable electric motor or the like, is provided to drive a gear 24 on shaft 19a, and a gear 25 mounted on shaft 18a, to drive shafts 18a and 19a in the same direction of rotation and at the same speed.

While I have shown the worm sections 18 and 19 as single lead worms, it is to be understood that other multiple lead screws having any number of leads may be fixed on the shafts 18a and 19a. While I've disclosed the worms 18 and 19 as of the cross-sectional shape shown in FIG. 4, it is to be understood that the worms 18 and 19 are selected according to the intensity of mixing, and characteristics of mixing, which are desired for a particular process. For instance, the shape disclosed in U.S. Pat. No. 3,900,187 or the shapes disclosed in U.S. Pats. Nos. 4,344,711 and 3,779,522 may be utilized.

The machine as described thus far may be considered to be conventional in character. Integrated with it to provide enhanced capability, is a communicating, enlarged section of the machine, generally designated 28, which communicates also with a discharge section, generally designated 29. Bolted to the inner casing 10, as at 30, is a flange 31 which is bolted as at 32 to a wall 33 defining one end of section 28. At its opposite or discharge end, section 28 has a discharge end wall 34, which bolts as at 35 to the flange 36 of a discharge housing 37 of figure eight cross-section, housing 37 being formed by an upper cylinder 38 intersecting with a lower cylinder 39 to provide intersecting discharge mixing chambers which open as at 40 through a discharge end wall 41 at the discharge end of the machine.

As FIG. 1 particularly illustrates, member 33 is provided with an internal, figure eight-section bore comprised of intersecting cylinder bores 42 and 43 forming continuations of the bore cylinders 14 and 15, respectively. Communicating with the cylinders 42 and 43 is a diverging figure eight in cross-section chamber formed of divergent, intersecting, axially parallel, frusto-conical bores 44 and 45 which provide a transition mixing chamber leading to an enlarged figure-eight in cross-section processing chamber portion formed in the wall 33 by identical, cylindrical, intersecting, axially parallel bores 46 and 47. Joined to the discharge end of wall 33 is a housing 47' of figure eight cross-section comprised of a pair of intersecting, cylindrical, axially parallel bores 48 and 49 forming a continuation of bores 46 and 47 respectively.

As FIG. 1 indicates, bores 42-43 and 44-45 form a transition processing chamber A, and the bores 48 and 49, together with the bores 46-47, form a processing chamber B. A slotted opening O is provided in the top of chamber 48 to provide access and permit venting. A second processing and transitional section C is defined by a convergent wall portion 47a which is of more shallowly diverging figure eight cross-section and is formed by axially parallel, diverging frusto-conical intersecting chambers 50 and 51 of gradually decreasing figure-eight cross-section. The wall 47a leads to end wall 34 which has a continuation chamber 34a of diverging figure eight cross-section formed by frusto-conical, axially parallel, intersecting chambers 52 and 53. Thus transition chamber C is formed by chambers 50–51 and 52–53. The center to center distance between all bores in the machine is maintained at a distance less than the diameter of the bores to ensure there is no central core of material which remains unpenetrated by the mixing blades which later will be described.

As FIG. 1 indicates, a pair of mutually co-wiping blades of uniform delta section, generally designated 54 and 55, connect eccentrically to the discharge ends 18b and 19b of worm shafts 18a and 19a. The blades in cross-sectional configuration perpendicular to their axis of extent are comprised of arcuate flanks of equal length separated by relatively narrow lands, the flanks being equal in length to the center to center distance between the bores 48-49. Alternatively, the cross-sectional configuration of each blade 54 and 55 could be circular, with a diameter equal to the center to center distance between the bores 48-49.

At their discharge ends the blades 54 and 55 join to shaft sections 56 and 57, respectively, which are co-axial with the shafts 18a and 19a on axes a and b. Intermeshing discharge worms 56a and 57a, which may be of the same cross-sectional configuration as blades 18 and 19, or of delta cross-section, may then be keyed to, or integrated with, the shaft section 56 and 57, respectively. The blades 54 and 55, from one end to the other, are shown as of common cross-sectional configuration but may be comprised of other screw configurations having an odd number of leads. At their front ends, blades 54 and 55 are shown as formed with linear or non-helical paddle sections 58 and 59 which extend through the chamber formed by intersecting bores 42 and 43. These paddles 58 and 59 have bores 60 for receiving the shaft ends 18b and 19b, respectively. It will be noted that the bores 60 are co-axial with the axes a and b, but are eccentric to the centers or axes of paddles 58 and 59. The ends 58 and 59 are also bored as at 61 so that bolts 62 or other fasteners can be threadably received in threaded bores 62a, provided in the front ends 18b and 19b of the shafts 18a and 19a to fixedly secure the blade ends 58 and 59 to the shafts 18a and 18b, respectively, for rotation in the same direction and at the same speed. It will be seen that the eccentricity of blade ends 58 and 59, with respect to the chamber walls 42 and 43, is such that the delta shaped in cross-section ends 58 and 59 completely wipe the chambers 42 and 43, while at the same time, the portions 58 and 59 wipe one another. Ends 58 and 59 could be worms of the same or different cross-sectional configuration. Blades 54 and 55 are also shown as having non-helical, crank portions 63 and 64 extending in the chambers 44 and 45 which similarly are of delta section perpendicular to their axis of extent, and not only wipe one another but also the walls of chambers 44 and 45. Within chambers B and C, blade sections or worm sections 54a and 55a are of considerably shallower pitch than worm sections 18 and 19, and longitudinally are U-shaped, rather than of linear extent. Conceivably the sections 54a and 55a could comprise linear paddles of the shape of blade ends 58 and 59 if the process were better served by this configuration. Within chamber B, the blade sections 54a and 55a of blades 54 and 55 are, in any event, of constant cross-section perpendicular to their axis of extent. At longitudinal location C the blades 54 and 55 are shown as including sections 54b and 55b, which are of the same delta cross-section in size and shape in the chambers 50-51 and 52-53 as the blade sections 54a and 55a. The axis of extent of the axially parallel sections 54b and 55b is parallel to the walls 47a and the slope of the bores 52 or 53 in wall member 34 so that the sections 54b and 55b completely wipe the walls of chambers 50-51 and 52-53 as they respectively move about axes a and b.

An outer housing 65 may be provided for the inner chamber walls 47-47a to define a heat transfer surrounding passage 66 supplied with circulating fluid via an inlet 67. The chamber 66 egresses fluid via an outlet 68. Likewise, an outer surrounding casing 69 defining a surrounding heat transfer passage 70 for a recirculating heat transfer fluid may be supplied by an inlet passage 71, and discharged by a discharge passage 72, communicating with the recirculant source of fluid.

THE OPERATION

Polymeric or other material to be proceesed or mixed may be supplied through charge opening 17 and moved continuously from right to left in FIG. 1 by the advancing and mixing worms 18 and 19. As it is conveyed, it is thoroughly mixed and kneaded and, of course, may be heated or cooled, as the process demands, by the heat transfer fluid supplied to passages 12. In the mixing chamber formed by bores 14 and 15 there is a continuous wiping of the chamber walls, as well as all of the surface of the worms 18 and 19, so that no dead spots of material will collect and degrade to interfere with the processing operation. From the chambers 14 and 15, the material passes to the chambers 42 and 43 wherein the paddle sections 58 and 59 continue the intensive mixing. Likewise, the walls of the mixing chamber formed by bores 42 and 43, as well as the paddle sections 58 and 59, are continuously wiped.

The transition mixing chamber A also includes the axially parallel bores 44-45 of progressively increasing, intersecting conical configuration which lead to the constant cross-section chamber of enalrged cross-section B in which blade sections 54a and 55a operate. Delta cross-section blade portions 63 and 64 similarly wipe one another and, at the same time, completely wipe the walls of chambers 44 and 45. The chambers 44-45, 46-47 and 48-49, in constrast to the previous chambers, are not completely filled with material and provide a relatively low intensity mixing in which shear stresses are considerably decreased. The material in chambers 44-45, 46-47 and 48-49 does not proceed axially as rapidly, and the retention time in these chambers is increased from the standpoint of axial flow velocity. It is at chamber section B that material in the form of fibers may be added to the polymeric mix and that venting and deaeration occurs.

Similarly, in transition mixing chamber 50-51, the material is not mixed with the previous intensity but is mixed with progressively increasing intensity as the material proceeds toward the discharge worms 56a-57a. Chamber walls 50-51 and 52-53 are continously wiped, and worm sections 54b and 55b also continuously co-wipe, to prevent any dead spots of material from accumulating. When the material reaches the discharge worm sections 56a and 57a it is once again more intensively mixed and advanced more rapidly to the figure eight discharge orifice 40. While in section B the blade portions 54a and 54b spiral 180 degrees, and in section C the blade portions 54b and 55b spiral another 180 degrees, it is believed other processes could vary this. Also, the blade portions 54a and 54b and 55a and 55b in some processes may not be helical.

Figure 10:
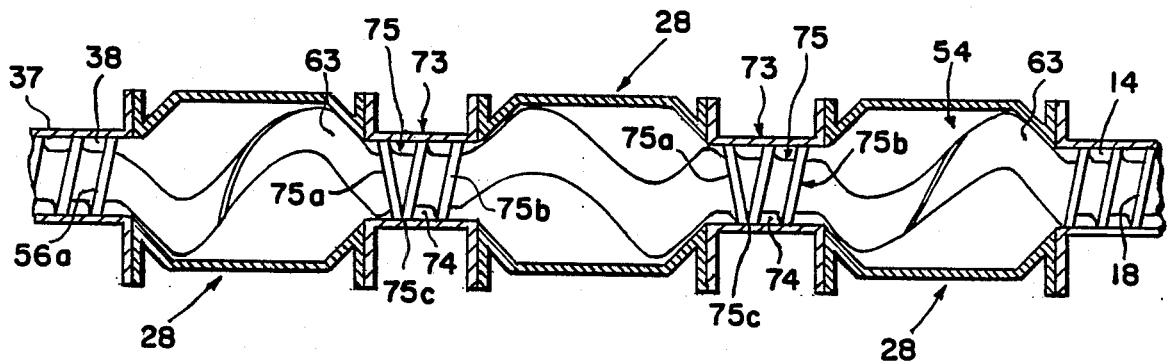
FIG. 10 is a reduced size, fragmentary, schematic, top plan view illustrating a modified multi-chamber embodiment of the invention.

In FIG. 10 a multi-stage further embodiment of the invention is disclosed in which a progressive, stepwise devolatilization, for instance, can be accomplished. In this top plan view, the same numerals have been used as previously to indicate the various elements which have been previously described. It is to be understood that FIG. 10 is a fragmentary view in which material is similarly proceeding from right to left from elongate screws 18 and 19 as previously to the various sections 28. The series of vacuum chambers 28 shown are utlized between the worms 18-19 and 56a-57b, with each section 28 having its opening O connected with a vacuum pump which produces decreasing vacuum levels as the material proceeds from the first chamber 28 to the third chamber 28, the latter being discharged by screws 56a-56b. With the chambers 28 operating at a very low degree of fill, maximum surface generation is achieved for the material to provide an excellent devolatilizing operation whcih is very useful for certain materials.

In this embodiment of the invention the mixing blades 54 and 55 do not have the paddle ends 58 and 59. Rather, the helical crank members 63 and 64 in transition chambers 44 and 45 connect directly to the ends of worms 18 and 19.

Each of the sections 28 is disclosed as separated from one another by a vacuum plug structure, generally designated 73, which may comprise a chamber 74 of figure eight cross-section in which a pair of axially parallel, single lead worms, generally designated 75, are provided which may be of the same configuration as scres 18 and 19 to provide wider lands for sealing purposes. Each of the twin worms 75, unlike the worms 18 and 19, may be comprised, however, of worms 75a and 75b of different hand which meet at a location 75c. Thus, worms 75b will be of the same hand as advancing worms 18 and 19, but worms 75a will be of opposite hand to form a moving material plug which seals the chambers 28, one from the other, while still delivering material to the chambers 28 in a continuous manner. As indicated previously, FIG. 10 is a schematic view and the various chambers are not shown as jacketed for the sake of simplicity of illustration, although, in practice, a temperature controlled fluid will normally be circulated in the jackets provided for all of the housing elements 12, 28, 74 and 37.

While one embodiment of the invention has been described in detail, it will be apparent to those skilled in the art that the disclosed embodiment may be modified. Therefore, the foregoing description in all apsects is to be considered exemplary rather than limiting in any way, and the true scope of the invention is that defined in the following claims.

We claim:

1. In a mixing machine having a barrel, with a first barrel portion having at least a pair of interconnected interior mixing bores, of a first diameter leading in a downstream direction from an inlet to an outlet; at least a pair of axially parallel shafts extending in the barrel; a drive mechanism for continuously revolving the shafts at the same speed and in the same direction of rotation; and mating mixer members on the shafts of a shape to completely co-wipe and also completely wipe the interior of the barrel;

the improvement comprising:
   a. a second barrel portion for said barrel with at least a pair of interconnected interior mixing bores of greater diameter than said first diameter extending axially concentrically with said bores of first diameter and including axially parallel interconnected transition bores of progressively changing diameter between said bores of first diameter and said bores of greater diameter;
   b. shaft sections extending from said axially parallel shafts through said second barrel portion, said sections having transition crank portions extending radially and axially in one direction through said transition bores and mixing blade portions extending radially and axially in the opposite direction so that said sections and portions form a V, the transition portions being configured to wipe one another over their length and said transition bores over their length, and the blade portions being configured to completely wipe one another over their length and said bores of increased diameter over their length.

2. The invention of claim 1 wherein said second barrel portion includes at least a pair of diametrally interconnected, reverse transition bores of progressively decreasing diameter leading from said bores of greater diameter; and said blade portions have extensions extending parallel to said bores of progressively decreasing diameter and configured to co-wipe over their length and to wipe said reverse transition bores over their length.

3. The invention of claim 2 wherein said mixing blade portions have non-helical ends which connect eccentrically to said shafts and said extensions have downstream ends co-axial with said axially parallel shafts.

4. The invention of claim 3 wherein said mixer members form worms and said blade portions and blade extensions form worms of shallow pitch relative to the mixer members on said shafts.

5. The invention of claim 4 wherein shaft parts co-axial with said shafts extend from said extensions, and co-wiping discharge worms are provided thereon; said barrel having a barrel portion with diametrally interconnected bores through which said discharge worms extend.

6. The invention of claim 4 wherein said blade portions and blade extensions are helical.

7. The invention of claim 2 wherein said blade portions and blade extensions are of the same cross-sectional configuration and dimension.

8. The invention of claim 1 wherein said first and second barrel portion bores form chambers of figure eight cross-section throughout; and said crank portions are of a configuration comprising linear or helical.

9. The invention of claim 1 wherein said blade portions are of a cross-sectional configuration used with worms having an odd number of leads.

10. The invention of claim 1 wherein said blade portions are of generally equilateral triangular configuration in cross-section perpendicular to the axes of extent of the blade portions.

11. The invention of claim 1 wherein said bores of greater diameter have a center to center distance less than the diameter of the bores.

12. In a mixing machine having a barrel, with at least a pair of interconnected interior mixing bores of a first diameter leading in a downstream direction from an inlet to an outlet; at least a pair of axially parallel shafts extending in the barrel; a drive mechanism connected with the shafts for revolving the shafts at the same speed and in the same direction of rotation; and mating mixer members on the shafts of a shape to co-wipe and also wipe the said bores of the barrel; a barrel portion incorporated with said barrel and having at least a pair of interconnected transition bores of progressiely changing diameter communicating concentrically with said bores of first diameter; and co-wiping sections connected with said mixter members for rotation therewith, said co-wiping sections including transition blades extending longituidnally radially and axially at an acute angle to said shafts through said transition bores and being configured to also completely wipe said transition bores.

13. The invention of claim 12 wherein said barrel portion includes at least a pair of diametrally interconnected reverse transition bores of progressively decreasing diameter communicating with said transition bores; and said blades have extensnions configured to co-wipe over their length and to wipe said reverse transition bores over their length.

14. The invention of claim 13 wherein said extensions have downstream ends co-axial with said axially parallel shafts.

15. The invention of claim 13 wherein said blades and extensions in longitudinal extent are compositely generally V-shaped.

16. The invention of claim 15 wherein said blades and blade extensions comprise worms of shallow pitch relative to said mixer members on said shafts.

17. The invention of claim 13 wherein a plurality of said barrel portions are incorporated and separated by barrel sections having interconnected bores; said blades and extensions being connected by axially parallel shaft parts extending axially in the bores of said barrel section; and co-wiping members, configured to form a vacuum seal with the material proceeding through, provided on said shafts.

18. A method of operating a mixing machine having a barrel, with at least a pair of interconnected interior mixing bores, of a first diameter leading in a downstream direction from an inlet to an outlet; at least a pair of axially parallel shafts extending in the barrel; a drive mechanism for revolving the shafts at the same speed and in the same direction of rotation; mating mixing and advancing members on the shafts of a shape to co-wipe and also wipe the interior of the barrel; a barrel portion for said barrel with at least a pair of interconnected interior mixing bores of greater diameter than said first diameter extending axially concentrically with said bores of first diameter and including interconnected transition bores of progressively increasing diameter leading concentrically from said bores of first diameter to said bores of greater diameter, co-wiping sections extending from said shafts through said barrel portion, and sections having co-wiping transition portions extending radially and axially at an angle to said shafts to co-wipe said transition bores and mixing blade portions extending axially in said bores of greater diameter, the blade portions being configured to wipe one another over their length and said bores of increase diameter over their length; the steps of:

a. charging material to be mixed to said inlet and revolving said mixing and advancing members in the same direction of rotation and at the same speed to advance and intensively mix said material;

b. receiving material from said barrel and directing it radially and axially in said transition bores while wiping said tansition bores; and c. receiving material from said transition bores and revolving said blade portions to less intensively mix the material while advancing it and wiping said bores of increased diameter.

19. The method defined in claim 18 wherein a plurality of said barrel portions are provided connected one to another by material advancing sections forming a seal between the barrel portions; and vacuum of decreased suction is applied to the barrel portions successively to draw volatiles off.

* * * * *

UNITED STATES PATENT AND TRADEMARK OFFICE
CERTIFICATE OF CORRECTION

PATENT NO. : 4,826,323
DATED : May 2, 1989
INVENTOR(S) : Bernard A. Loomans and James E. Kowalczyk It is certified that error appears in the above-identified patent and that said Letters Patent is hereby corrected as shown below:

Column 1, lines 15/16 change, "sufraces" to -- surfaces --.

Column 1, line 54, change "whcih" to -- which --.

Column 6, line 25, change "57b" to -- 56b --.

Column 6, line 44, change "scres" to -- screws --.

Column 8, line 18, change "progressiely" to -- progressively --.

Column 8, line 31, change "extensnions" to -- extensions --.

Column 8, line 68, change "and" to -- said --.

Column 9, line 7, change "increase" to -- increased --.

Column 10, line 3, change "tansition" to -- transition --.

Signed and Sealed this

Fifth Day of December, 1989

Attest:

JEFFREY M. SAMUELS

Attesting Officer    Acting Commissioner of Patents and Trademarks